E. O. Shepardson,

Capstan.

No. 100,197.   Patented Feb. 22, 1870.

Witnesses:
William W. Herthel
Robert Burns

Inventor:
Elijah O. Shepardson
by his attys
Herthel & Co

United States Patent Office.

E. O. SHEPARDSON, OF SAINT LOUIS, MISSOURI.

Letters Patent No. 100,197, dated February 22, 1870.

IMPROVED APPARATUS FOR TOWING RAFTS, &c.

The Schedule referred to in these Letters Patent and making part of the same.

*To all whom it may concern:*

Be it known that I, E. O. SHEPARDSON, of Saint Louis, in the county of Saint Louis, and State of Missouri, have made certain new and useful Improvements in Compensating Windlass and Capstans for Steering Rafts and similar purposes; and I do hereby declare the following to be a full and true description thereof, reference being had to the accompanying drawings, and to the letters of reference marked thereon.

It is known that in towing rafts, barges, and similar craft, the towing-vessel is usually in the rear of the tow, and the latter is connected by lines with the tow-boat, the lines being usually connected with an ordinary windlass or capstan, so that the position of the vessel and tow relative to each other may be changed for the purposes of steering, causing in effect the vessel to act as a rudder to guide the tow.

In order to avoid the danger and delay occurring with the ordinary windlass and capstan when one rope becomes slacked whilst the other is drawing in, the nature of this invention is in the use of two drums, connected by suitable gearing, so that the one shall wind up the line and the other pay out correspondingly, thus holding the vessel by two taut lines in any of the positions required.

To enable those herein skilled to make and use my said invention I will now more fully describe the same, referring to the accompanying—

Figure 1:
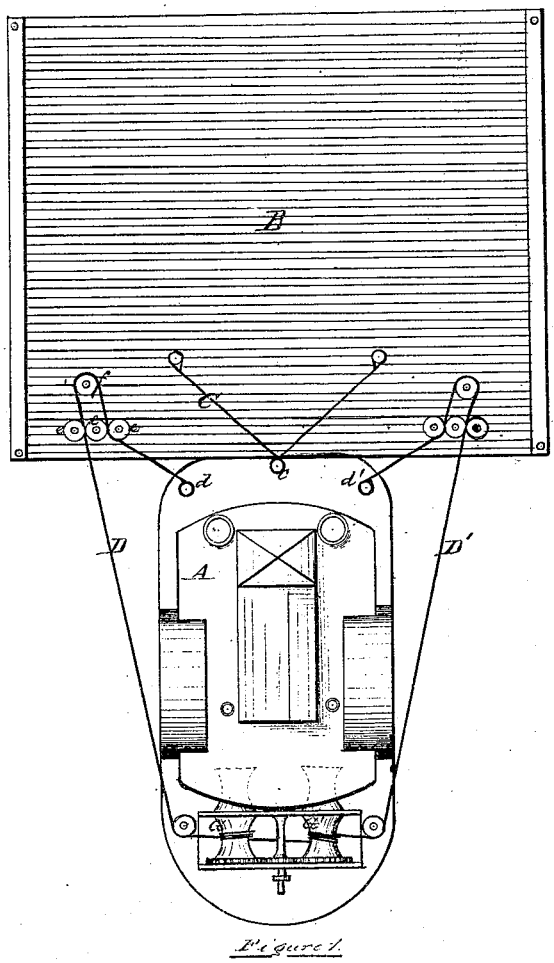
Figure 2:
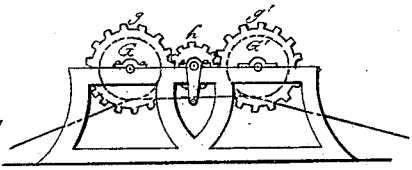

Figure 1 as a plan of a vessel towing a raft, to
Figure 2 as an end view of the windlass.
In said figure 1—
A represents the towing-vessel.
B, the raft or other tow.
The vessel A connects with the raft by the line C, the connection being such that the vessel is, in effect, pivoted at c, and may be turned by operating the line D D'. Said line is made fast to the vessel near the outer edge of the bow at $d$ $d'$, and said line then passes the guide-sheaves $e$ and pulley $f$, and goes to the stern of the vessel to wind about the drum G, and then around the drum G', and finally connects with the raft by sheaves and pulleys as at the other side, and secures to the bow at $d'$.

The drums G G' have gear-wheels, $g$ $g'$, respectively, connected by an intermediate pinion, $h$, this being operated by the power-source in any usual manner.

It is plain, then, that to shift the position of the vessel A, with respect to the tow axis, as in steering, the drum G, being rotated to draw in the line D, the drum G' will correspondingly pay out the line D'.

If the windlass is needed for other purposes, an additional line may be attached to the line D D', securing the tow and vessel so as to free the windlass.

When the windlass G G' is placed upright it will be used as a capstan.

Having thus fully described my invention,
What I claim is—

The arrangement of a tow-line, D D', on the sides of a vessel, when said line passes over drums G G', said drums being connected by proper gearing with an intermediate pinion, the whole operating as and for the purposes set forth.

In testimony of said invention I have hereunto set my hand this 7th day of June, A. D, 1869.

E. O. SHEPARDSON.

Witnesses:
GEORGE P. HERTHEL, Jr.,
WILLIAM W. HERTHEL.